F. H. VAN LOOZEN.
ARMORED TIRE.
APPLICATION FILED MAR. 24, 1919.
1,322,739.
Patented Nov. 25, 1919.
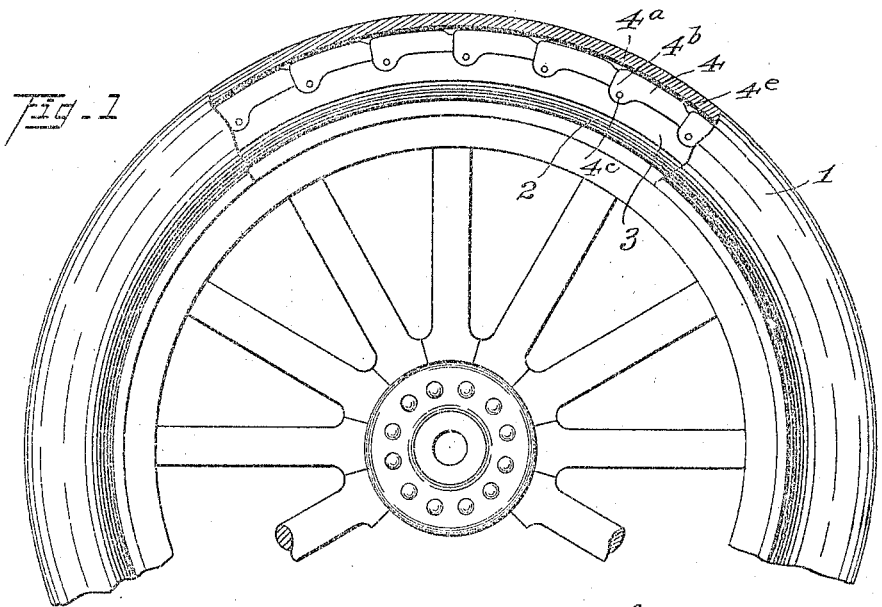
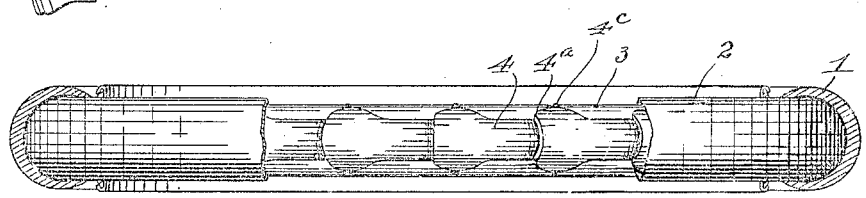
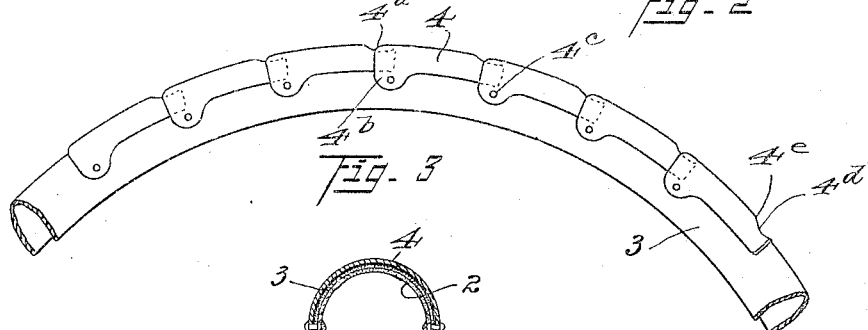
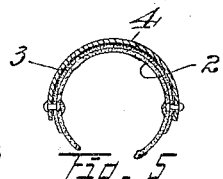
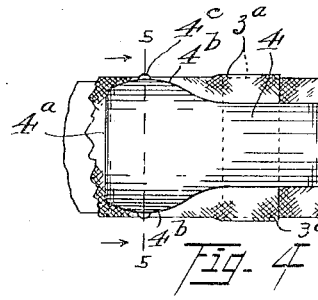
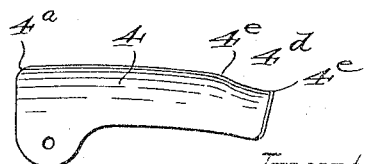
Inventor
Fred H. Van Loozen

UNITED STATES PATENT OFFICE.

FRED H. VAN LOOZEN, OF CLEVELAND, OHIO.

ARMORED TIRE.

1,322,739.    Specification of Letters Patent.    Patented Nov. 25, 1919.

Application filed March 24, 1919. Serial No. 284,754.

*To all whom it may concern:*

Be it known that I, FRED H. VAN LOOZEN, citizen of the United States, residing at Cleveland, in the county of Cuyahoga and State of Ohio, have invented certain new and useful Improvements in Armored Tires, of which the following is a specification.

My invention relates to improvements in armored tires, and more particularly to armored devices for pneumatic tires comprising, generally speaking, an armor carrying member or lining strip adapted to be interposed between the inner tube and tire casing or shoe of an ordinary pneumatic tire, said carrying member or lining strip being provided with a series or plurality of flexible longitudinally overlapping armor shoes curved longitudinally and transversely to conform to the contour of the tire, each of said shoes being pivotally connected at one end and terminating in a freely movable end beneath and adapted to be moved independent of the attaching base of an adjacent armor shoe.

The primary object of the invention is to provide a generally improved armored device for pneumatic tires which will be exceedingly simple in construction, cheap of manufacture, and efficient in use.

A further object is the provision of an improved armor device which may be readily used in connection with any ordinary pneumatic tire which will not only prevent punctures of the inner tube through the prevention of sharp articles coming into contact with such inner tube, but one which will not materially diminish the resiliency of the tire and which will not destroy or injure the inner tube and tire casing while in use.

A still further object is the provision of an improved armor device made up of a plurality of relatively thin flexible overlapping metallic armor shoes (or other suitable flexible armor material) so arranged and disposed relative to each other as to prevent disarrangement while in use and at the same time being freely movable inwardly toward the inner tube as in passing over and absorbing obstructions, the overlapping portions being particularly designed so as not to injure the inner tube or tire casing during the varying exigencies of actual service.

With the above mentioned and other ends in view the invention consists in the novel construction, arrangement and combination of parts, hereinafter described, illustrated in one of its embodiments in the accompanying drawings, and particularly pointed out in the appended claims.

Referring to drawing, forming a part of this specification, Figure 1, is a fragmentary side elevation of an ordinary vehicle wheel and pneumatic tire embodying my improvements, a portion of the tire casing or shoe being broken away for the purpose of clearer illustration of the parts.

Fig. 2, a plan view of the same, a portion of the casing being shown in section and a portion being broken away for the purpose of clearer illustration of the internal parts.

Fig. 3, a fragmentary side elevation of the armor carrying member or lining strip and its overlapping movable armor shoes adapted to be inserted between the inner tube and tire casing.

Fig. 4, an enlarged fragmentary top plan view of the inner tube and of the overlapping ends of the armor carrying member and one of its armor shoes.

Fig. 5, a cross sectionel view taken on line 5—5 of Fig. 4.

Fig. 6, a side elevation of one of the armor shoes, detached.

Similar numerals of reference designate like parts throughout all the figures of the drawings.

The tire casing 1, and inner tube 2, may be of any suitable and convenient construction, the improved armor device being particularly designed and adapted for use in connection with pneumatic tires embodying inner tubes and casings of any ordinary or conventional construction.

Referring now to the improved armor device to which this invention relates, I provide an improved armor carrying member or lining strip 3, of suitable flexible material, preferably of canvas, said armor carrying member or strip being adapted to be interposed between the inner tube 2 and the tread portion of the tire casing 1, and being of channel or U-shape in cross section, as shown most clearly in Fig. 3 of the drawings.

As a means of providing a suitable armor for preventing the piercing or puncturing of the inner tube from foreign substances, such as nails, tacks, glass, or the like, and at the same time allowing the requisite movements to the tire casing and inner tube in the act of passing over and absorbing obstructions, such as stones, irregular surfaces, and the like, the armor carrying or lining strip 3, is provided with a series or plurality of movably and flexibly connected longitudinally extending overlapping armor shoes 4, said shoes 4, being curved longitudinally and transversely to conform to the contour of the inner tube and tire casing, as shown in the drawings.

Each armor shoe preferably comprises an attaching base having a curved beveled portion $4^a$, said attaching base being adapted to be flexibly attached to the sides of the carrying member or strip 3, in any suitable and convenient manner, preferably, by means of attaching lugs $4^b$, provided with hinge or rivet members $4^c$, passing through and attached to the lining strips 3, as shown most clearly in Fig. 5, of the drawings. Each armor shoe 4, is preferably formed of relatively thin flexible material adapted to resist the action of nails or pointed articles passing through the tire casing, and it will be observed that each armor shoe comprises a main body or lever portion adapted to extend longitudinally of the lining strip and within the tire casing, said main body portion terminating in an off-set or depressed free end $4^d$, arranged beneath and movable downwardly independently of the pivoted portion $4^a$, of an adjacent shoe. It will thus be seen that the pivoted base portion of one shoe acts to limit the outward movement of the free end of the other shoe and at the same time permits the main body portion of the shoe to move inwardly to the inner tube in passing over and absorbing obstructions while in use.

It will be seen that the free end $4^d$, is off-set or depressed to correspond with the thickness of the adjacent base or pivoted end of the adjacent shoe to provide a continuous bearing surface, and that the beveled portions $4^a$, and $4^e$, of the off-set or depressed free ends prevent any injury to the inner tube and casing in the movements of such armor shoes.

As a means of preventing any creeping of the lining strip 3, to buckle or crinkle within the tire casing while in use, as well as providing for the armor carrying member or strip to adjust itself to variations in the tube and casing, the armor carrying member 3, is preferably not formed endless, but provided with overlapping ends $3^a$, as shown in Fig. 4 of the drawings, thereby adapting the same to the variations which may naturally occur in actual service.

From the foregoing description, taken in connection with the accompanying drawings, the operation and advantages of my invention will be readily understood.

Having thus described some of the embodiments of my invention, what I claim and desire to secure by Letters Patent, is,—

1. In an armored tire, a lever shaped armor shoe curved throughout to conform to the contour of the tire and comprising a pivoted base and an off-set free end, the latter being adapted to extend and move inwardly within the pivoted portion of an adjacent armor shoe.

2. In an armored tire, an armor shoe curved throughout to conform to the contour of the tire and comprising a pivoted base portion and a curved lever member, the latter having its free end within and freely movable independently of the pivoted base portion of an adjacent armor shoe.

3. In an armored tire, a flexible channel shaped lining member carrying a plurality of channel-shaped flexible armor shoes, each of said shoes being curved throughout to conform to the contour of the tire and comprising pivot members connected to the sides of said lining member, and a lever member terminating in an off-set free end extending within and movable inwardly independently of the pivoted portion of an adjacent shoe.

In testimony whereof I have affixed my signature.

FRED H. VAN LOOZEN.